Jan. 21, 1958 R. C. KOCH 2,820,890

RADIO CHASSIS CONSTRUCTION

Filed April 29, 1955

INVENTOR.
RICHARD C. KOCH
BY
Lockwood, Galt, Woodard, & Smith
ATTORNEYS

United States Patent Office 2,820,890

Patented Jan. 21, 1958

2,820,890

RADIO CHASSIS CONSTRUCTION

Richard C. Koch, Indianapolis, Ind., assignor to I. D. E. A., Inc., Indianapolis, Ind.

Application April 29, 1955, Serial No. 504,945

4 Claims. (Cl. 250—16)

The present invention relates to radio chassis construction, and more particularly to a suitably rigid and compact supporting chassis for use in miniature radios.

In the field of radio receivers, continuous effort is being expended toward reducing the size of radio receivers. Portable radio receivers powered by batteries are common and vary in size. Since the advent of transistors, the size of radios may even be further reduced, because the space normally occupied by vacuum tubes is now available for the smaller transistors. Since the transistor is materially smaller in size than the customary vacuum tubes, it normally follows that radio receivers may be made smaller and more compact.

Since transistors may now be used in place of vacuum tubes, new fields are open for exploitation in making radio receivers more compact and smaller than heretofore considered possible.

In view of the foregoing, it is an object of this invention to provide a radio chassis construction which is rigid and compact and especially adapted for use with transistors.

It is another object of this invention to provide a radio chassis construction for a miniature pocket size radio, such chassis utilizing a printed circuit.

It is still another object of this invention to provide a radio chassis construction wherein two elements, namely, a metallic chassis and a printed circuit board constitute the entire chassis construction.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
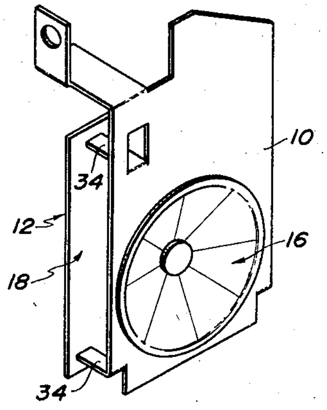
Fig. 1 is a perspective illustration of one embodiment of this invention.
Figure 2:
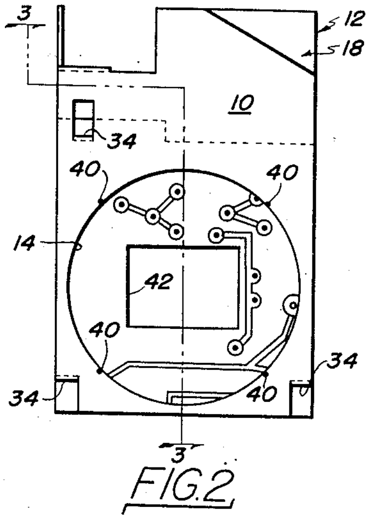
Fig. 2 is a front elevation thereof with the speaker removed.
Figure 3:
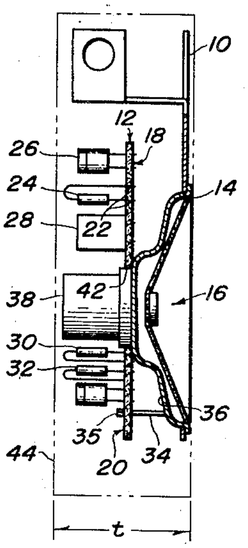
Fig. 3 is a sectional illustration taken substantially along section line 3—3 of Fig. 2.
Figure 5:
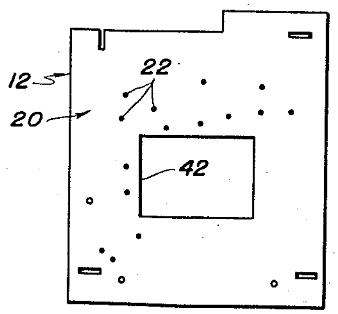
Figure 6:
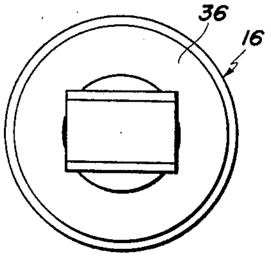
Figs. 6 and 7 are front and rear views of a speaker used with the chassis.
Figure 7:
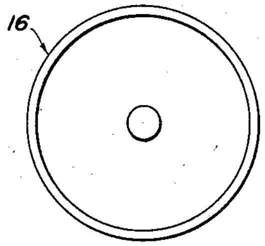

Referring to the drawings, the radio chassis comprises essentially only two parts, namely, a metal chassis 10 and a printed circuit board 12. The metal chassis 10 has a circular central opening 14 for receiving a speaker 16. The element 12 is of conventional construction and consists primarily of a phenolic insulator board having on one surface 18 a printed wiring circuit. On the opposite side 20 (Fig. 5) of the board 12 there is nothing, this surface being utilized to receive and mount the component parts of the radio. The board 12 is provided with a number of particularly arranged apertures 22 which register with certain portions of the printed circuit 18 and which receive wires of component parts as illustrated by Fig. 3. For example, a resistor 24 has its leads passing through the apertures 22 to be soldered to certain portions of the printed circuit 18 on the opposite side of the board. A transistor 26 similarly has leads passing through the board 12 to be connected to the printed circuitry as does an intermediate frequency transformer 28 and other component parts 30 and 32.

The board 12 is secured parallel to and spaced from the chassis 10 by means of lugs or ears 34 which are bent rearwardly from the chassis 10 to pass through companion openings in the board. The lugs 34 have the ends 35 twisted slightly so as to provide a secure fastening.

The speaker 16 is composed of the usual metal basket 36 and rearwardly projecting magnet 38. The chassis opening 14 is made to substantially the same diameter as the outer perimeter of the basket 36. The basket is secured to the chassis preferably by soldering at circumferentially spaced points 40. The magnet 38 passes rearwardly through companion opening 42 in the insulator board 12, as shown more clearly in Fig. 3, and the magnet 38 projects beyond the board as shown.

It will be noted in Fig. 3 that the height of the magnet 38 substantially determines the thickness "*t*" of the radio receiver which is illustrated as having a cabinet outline indicated by the reference numeral 44. The component parts 24, 26, 28, 30 and 32 are all mounted on the board 12 in such a position as to occupy the height dimension determined by the magnet 38 and are placed as closely together as possible in order to secure utmost compactness. The printed circuit 18 on the board 12 is positioned adjacent the chassis 10, so that the space between the chassis 10 and board 12 is efficiently utilized.

It will now be appreciated that the chassis is composed of essentially two separate parts, namely, the metal chassis 10 and the board support 12. Since the speaker basket 36, which is normally very rigid in construction, is securely fastened to the metallic chassis 10 by means of the solder joints 40, the speaker basket itself becomes an integral part of the chassis construction. This integration provides increased rigidity in the chassis 10 and contributes to the support of the board 12. The ears 34 extending from the chassis 10 impart rigidity to the board 12 and tend to secure the latter against unusual stresses and strains which can cause buckling of the board and cracking of the printed circuitry. Thus, it can be summarized that the metal chassis 10 provides the basic strength and support while the board 12 provides the basic wiring circuit. The chassis 10 and board 12 conjointly provide a rigid structure which is integrated into a single unit requiring no other cabinetry for support. The complete radio is entirely supported by this chassis constuction, which may be enclosed in a suitable cabinet 44 if desired.

Figure 4:
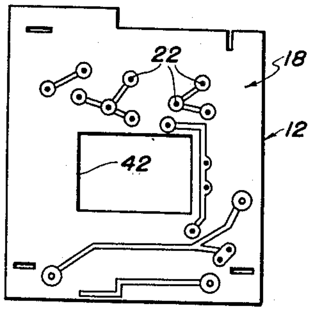
Figs. 4 and 5 are elevational views of opposite sides of the printed circuit board.

By arranging the chassis 10 and board 12 parallel and closely spaced as shown, the receiver is made small and compact yet is capable of providing all the support required in mounting the various component parts. Normally wasted space is used which conduces to compactness. The space between the chassis 10 and board 12 receives the solder joints and wiring, thereby utilizing space which is normally wasted. As seen in Fig. 4, the magnet opening 42 is completely encircled by printed circuitry, thereby making use of every available unit of area on the board.

The circuitry for this transistor radio is fully disclosed in Koch application Serial No. 496,779, entitled "Transistor Radio Apparatus."

What is claimed is:

1. A chassis construction for a radio receiver comprising a flat metallic supporting chassis having a speaker opening, a printed circuit board spaced from and mounted parallel to said supporting chassis, said board having a central speaker magnet-receiving opening in registry with said speaker opening, mounting ears extending from said chassis through said board for rigidly securing the chassis and board together, said chassis imparting rigidity to said board, said board having a printed wiring circuit on one side only adjacent said chassis, component parts being mounted on the other side of said board and having leads passing therethrough for connection to said printed wiring circuit, and a speaker having a metallic supporting basket and a magnet, said basket being received by said chassis opening and secured to said chassis thereby imparting rigidity to said chassis, said magnet being received by said board opening, said speaker thereby constituting a part of the chassis which contributes to the support of said board.

2. A chassis construction for a radio receiver comprising a flat metallic supporting chassis having a speaker opening, a printed circuit board spaced from and mounted parallel to said supporting chassis, said board having a central speaker magnet-receiving opening in registry with said speaker opening, mounting ears extending from said chassis through said board for rigidly securing the chassis and board together, said chassis imparting rigidity to said board, said board having a printed wiring circuit on one side only adjacent said chassis, and component parts being mounted on the other side of said board and having leads passing therethrough for connection to said printed wiring circuit.

3. A chassis construction for a radio receiver comprising a flat supporting chassis having a speaker opening, a circuit board spaced from and mounted parallel to said supporting chassis, a wiring circuit having all portions thereof secured to said board, said board having a central speaker magnet-receiving opening in registry with said speaker opening, and spaced apart mounting elements extending from said chassis and attached to said board for rigidly securing the chassis and board together, said chassis imparting rigidity to said board.

4. A chassis construction for a radio receiver comprising a flat supporting chassis having a speaker opening, a circuit board spaced from and mounted parallel to said supporting chassis, said board having a speaker magnet-receiving opening in registry with said speaker opening, at least two upstanding individual mounting elements extending from said chassis and fixedly attached to said board, said mounting elements being spaced apart whereby the board and chassis are rigidly secured together, said board having a wiring circuit on one side adjacent said chassis, a speaker having a magnet, said speaker being interposed between said chassis and board and fitting over said chassis opening, said magnet extending through said board opening a given distance beyond said board, thereby defining a thickness dimension for the construction, and component parts mounted on the side of said board opposite said chassis, none of said component parts extending beyond said thickness dimension.

References Cited in the file of this patent

UNITED STATES PATENTS

| | | |
|---|---|---|
| 2,174,107 | Kenny | Sept. 26, 1939 |
| 2,468,727 | Bauman | May 3, 1949 |
| 2,486,230 | Van Lammeren | Oct. 25, 1949 |

FOREIGN PATENTS

| | | |
|---|---|---|
| 340,267 | Italy | May 7, 1936 |

OTHER REFERENCES

"Printed Circuit Wiring," Electronic Industries, April 1946.